(12) United States Patent
Natanzon et al.

(10) Patent No.: US 9,582,382 B1
(45) Date of Patent: Feb. 28, 2017

(54) SNAPSHOT HARDENING

(75) Inventors: Assaf Natanzon, Ramat-Gan (IL); Ido Singer, Nes-Ziona (IL); Saar Cohen, Moshav-Mishmeret (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 671 days.

(21) Appl. No.: 12/969,920

(22) Filed: Dec. 16, 2010

(51) Int. Cl.
*G06F 17/30* (2006.01)
*G06F 11/20* (2006.01)

(52) U.S. Cl.
CPC ..... *G06F 11/2069* (2013.01); *G06F 17/30008* (2013.01)

(58) Field of Classification Search
CPC .................. G06F 11/2069; G06F 111/30008
USPC .......................................................... 707/690
See application file for complete search history.

(56) References Cited

U.S. PATENT DOCUMENTS

| | | | |
|---|---|---|---|
| 5,592,618 A * | 1/1997 | Micka | G06F 11/2074 711/162 |
| 6,721,721 B1 * | 4/2004 | Bates et al. | |
| 7,472,139 B2 * | 12/2008 | Nishikawa et al. | |
| 7,707,184 B1 * | 4/2010 | Zhang et al. | 707/645 |
| 7,934,262 B1 * | 4/2011 | Natanzon et al. | 726/24 |
| 7,991,749 B2 * | 8/2011 | Nishikawa et al. | 707/682 |
| 8,065,442 B1 * | 11/2011 | Chatterjee et al. | 710/5 |
| 8,214,612 B1 * | 7/2012 | Natanzon | 711/162 |
| 8,335,771 B1 * | 12/2012 | Natanzon | G06F 17/30008 707/684 |
| 8,364,648 B1 * | 1/2013 | Sim-Tang | 707/674 |
| 2007/0112894 A1 * | 5/2007 | Okada et al. | 707/204 |
| 2007/0162513 A1 * | 7/2007 | Lewin et al. | 707/200 |
| 2007/0186068 A1 * | 8/2007 | Agrawal | G06F 11/1456 711/162 |
| 2011/0099633 A1 * | 4/2011 | Aziz | 726/24 |
| 2011/0295815 A1 * | 12/2011 | Mandagere et al. | 707/690 |

* cited by examiner

*Primary Examiner* — Alexey Shmatov
*Assistant Examiner* — Kurt Mueller
(74) *Attorney, Agent, or Firm* — Krishnendu Gupta; Joseph J. D'Angelo

(57) ABSTRACT

A method, system, and computer product for hardening a snapshot in a journal based replication environment comprising a production and replication site, the replicated environment running in production side protection mode, the method comprising sending notification of a start of the check from the production site to the replication site, receiving the notification at the replication site, and recording the start of the check, running a check on the replication environment, associating the check with one or more snapshots, upon completion of the check, and storing the results of the check on the replication site.

23 Claims, 11 Drawing Sheets

SNAPSHOT HARDENING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer product for hardening a snapshot in a journal based replication environment comprising a production and replication site, the replicated environment running in production side protection mode, the method comprising sending notification of a start of the check from the production site to the replication site, receiving the notification at the replication site, and recording the start of the check, running a check on the replication environment, associating the check with one or more snapshots, upon completion of the check, and storing the results of the check on the replication site.

DETAILED DESCRIPTION

Figure 1:
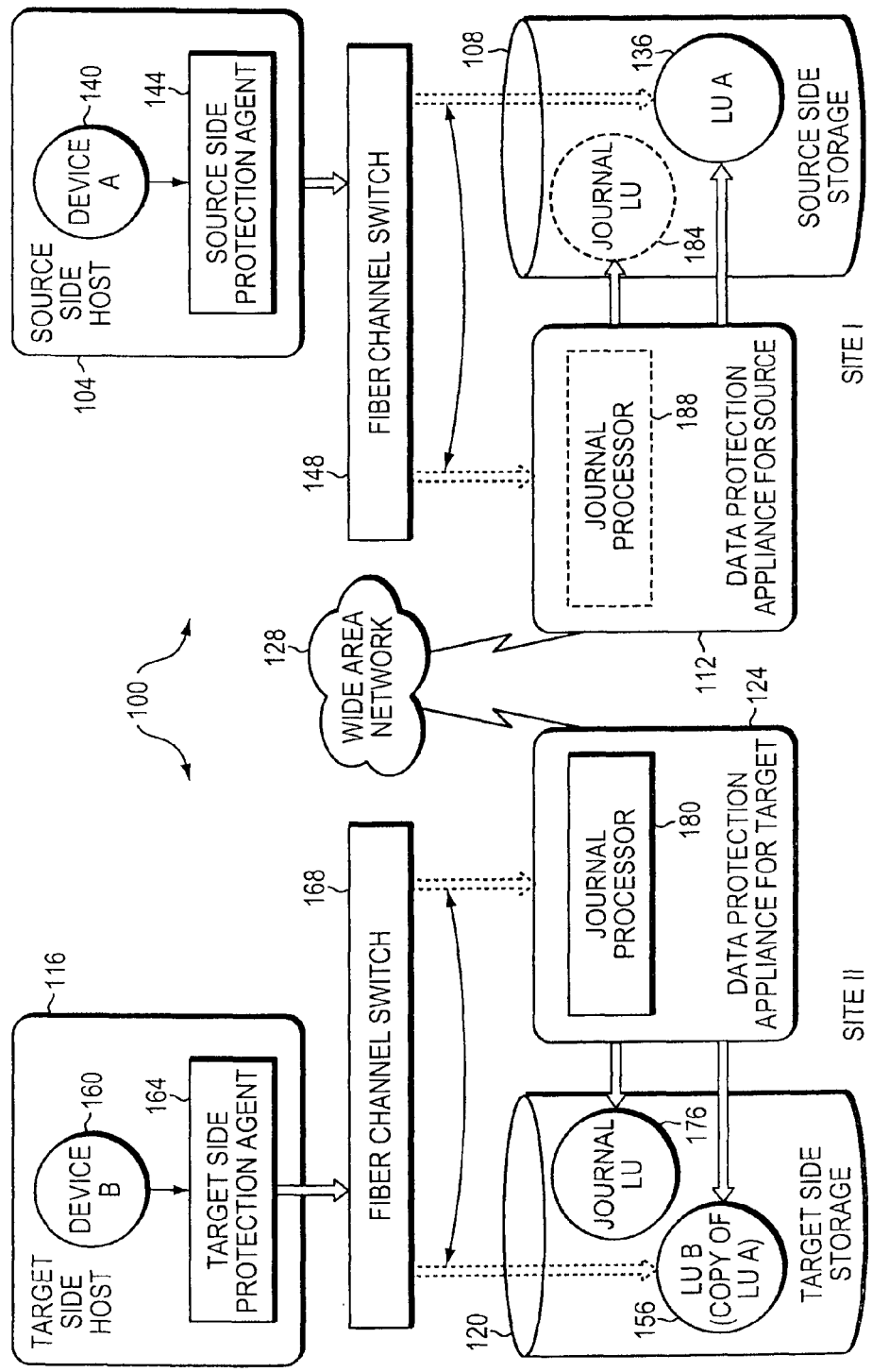
FIG. 1 is a simplified illustration of a data protection system, in accordance with an embodiment of the present disclosure.

Typically with continuous data protection, an image of the replicated volumes and a journal which describes changes in the volumes is provided. Sometimes, a problem may occur causing the replicated data to not be consistent. In certain cases, such problems may occur when a splitter becomes unstable. In some cases, the splitter may have moved to marking on splitter mode. Typically, the system may discover the problems and stop replication until problem stabilizes; however, generally it may take time to discover the problem. This may result in some snapshots in the journal which may not be acceptable for use. Generally, the user may not know that the snapshots are not usable. Thus, it may be advantageous in certain embodiments to not allow the user to see or access these snapshots.

In other embodiments, the replication may be functioning correctly; however an application may not be functioning correctly. Thus, while the information is being replicated, one or more applications may be causing problems with the system. In further embodiments, the replication may be functioning correctly, however a virus or other inconsistency may have infected the system. In a further embodiment, the may be a configuration change which is unacceptable and may cause problems.

In some embodiments, the current disclosure enables a mechanism which checks the system periodically. In certain embodiments, a message may be sent if the status of a snapshot is acceptable or unacceptable. In alternative embodiments, the journal manager may have knowledge which snapshots are known to be ok, or if the integrity of a snapshot may be compromised.

In certain embodiments, the current disclosure may enable information to be stored to denote which snapshots are acceptable based on one or more checks. In one embodiment, this may include information that up to a particular time T, all splitters are functioning correctly. In other embodiments, this may include information that a virus scan has been performed on a particular snapshot. In at least some embodiments, the information may include that the applications are functioning correctly. In other embodiments, this may include information that the configuration is correct. In some embodiments, this information may be in the form of metadata. In certain embodiments, this information may be stored in the journal.

The following definitions may be useful in understanding the specification and claims:

BACKUP SITE—may be a facility where replicated production site data is stored; the backup site may be located in a remote site or at the same location as the production site;

CHECK—may be one or more tests run on the replication. The Check may be used to supply information about a snapshot. This information provide snapshot hardening by denoting, for example, whether or not the snapshot has been tested for consistency, viruses, or splitter functionality.

CLONE—may be a clone may be a copy or clone of the image or images, drive or drives of a first location at a second location DPA—may be a computer or a cluster of computers that serve as a data protection appliance, responsible for data protection services including inter alia data replication of a storage system, and journaling of I/O requests issued by a host computer to the storage system;

HOST—may be at least one computer or networks of computers that runs at least one data processing application that issues I/O requests to one or more storage systems; a host may be an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

REPLICATION—may refer to the backing up of data from a production site to a replication site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period. Snapshots may be taken by an array service which may be called an array based snapshot.

SPLITTER/PROTECTION AGENT—may be an agent which intercepts IOs on the data path between the host and the storage array, the splitter may split the IOs to a protection appliance, fail the IOs to the storage device, or redirect the IOs to another storage device.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference. A description of an example of virus checking using journaling data may be described in the patent application title "METHODS AND APPARATUS FOR VIRUS DETECTION USING JOURNAL DATA" filed on Dec. 26, 2007 with Ser. No. 11/964,138, which is hereby incorporated by reference. A description of an example of consistency may be described in the patent application title "ENSURING CONSISTENCY OF REPLICATED VOLUMES" filed on Sep. 28, 2009 with Ser. No. 12/568,203, which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 may be a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, a storage array, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 handle the IO. The host may be able to handle several IOs in parallel.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
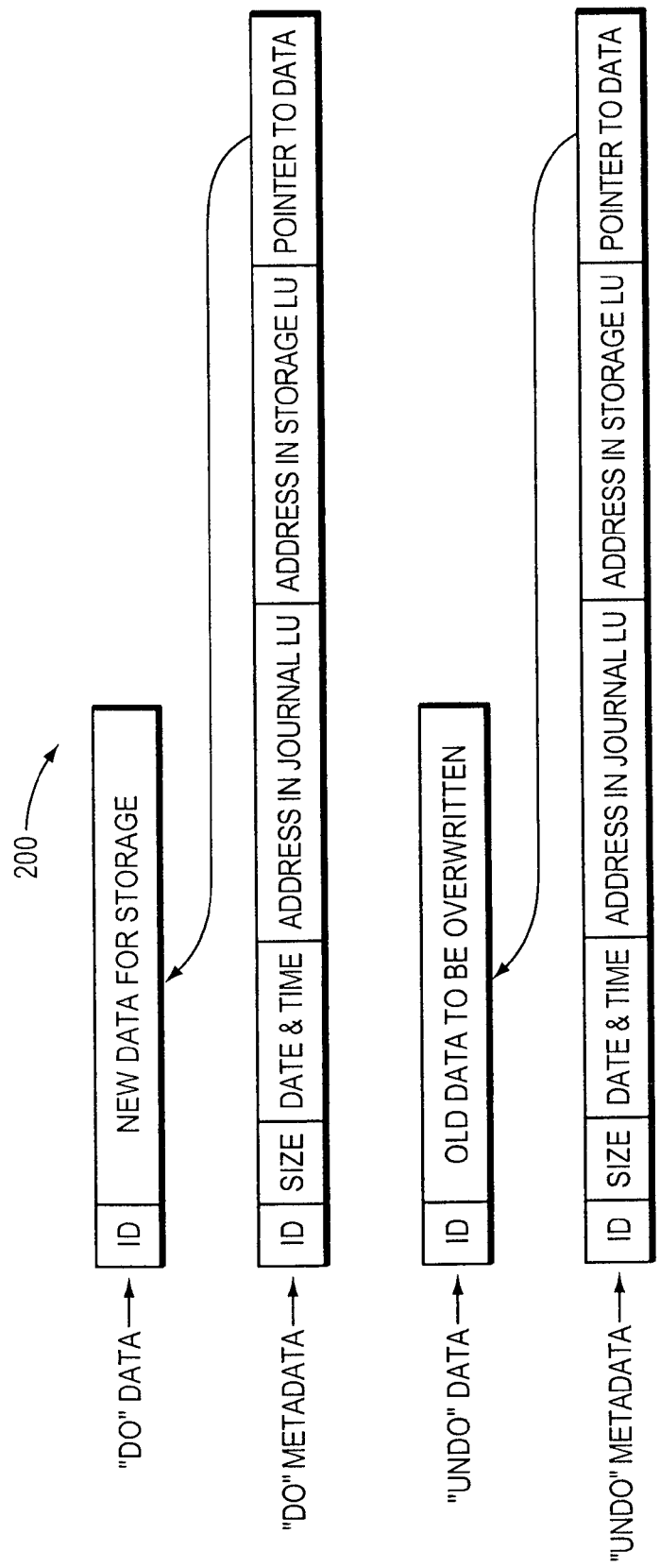
FIG. 2 is a simplified illustration of a write transaction for a journal, in accordance with an embodiment of the present disclosure.
Figure 3:
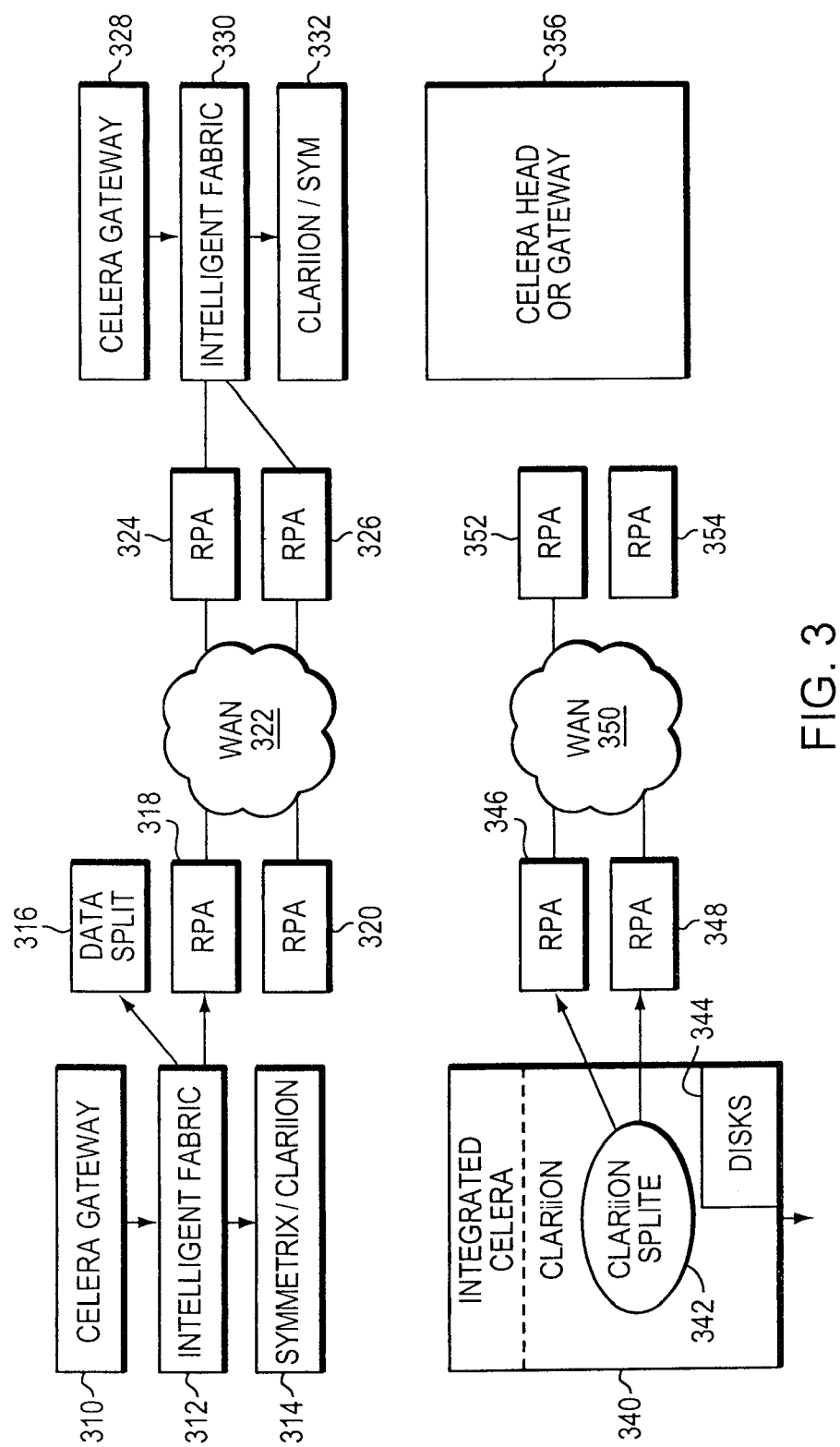
FIG. 3 is an alternative simplified illustration of a data protection system, in accordance with an embodiment of the present disclosure.
Figure 4:
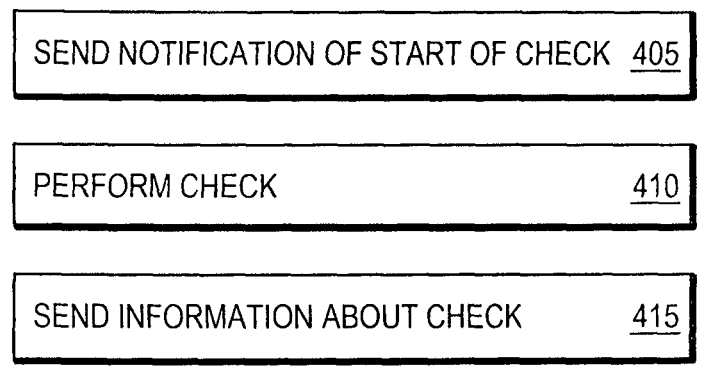
FIG. 4 is a simplified method in accordance with an embodiment of the present disclosure.
Figure 5:
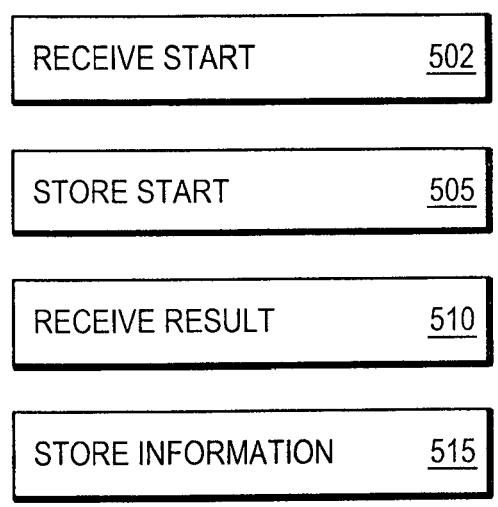
FIG. 5 is an alternative simplified method in accordance with an embodiment of the present disclosure.
Figure 6:
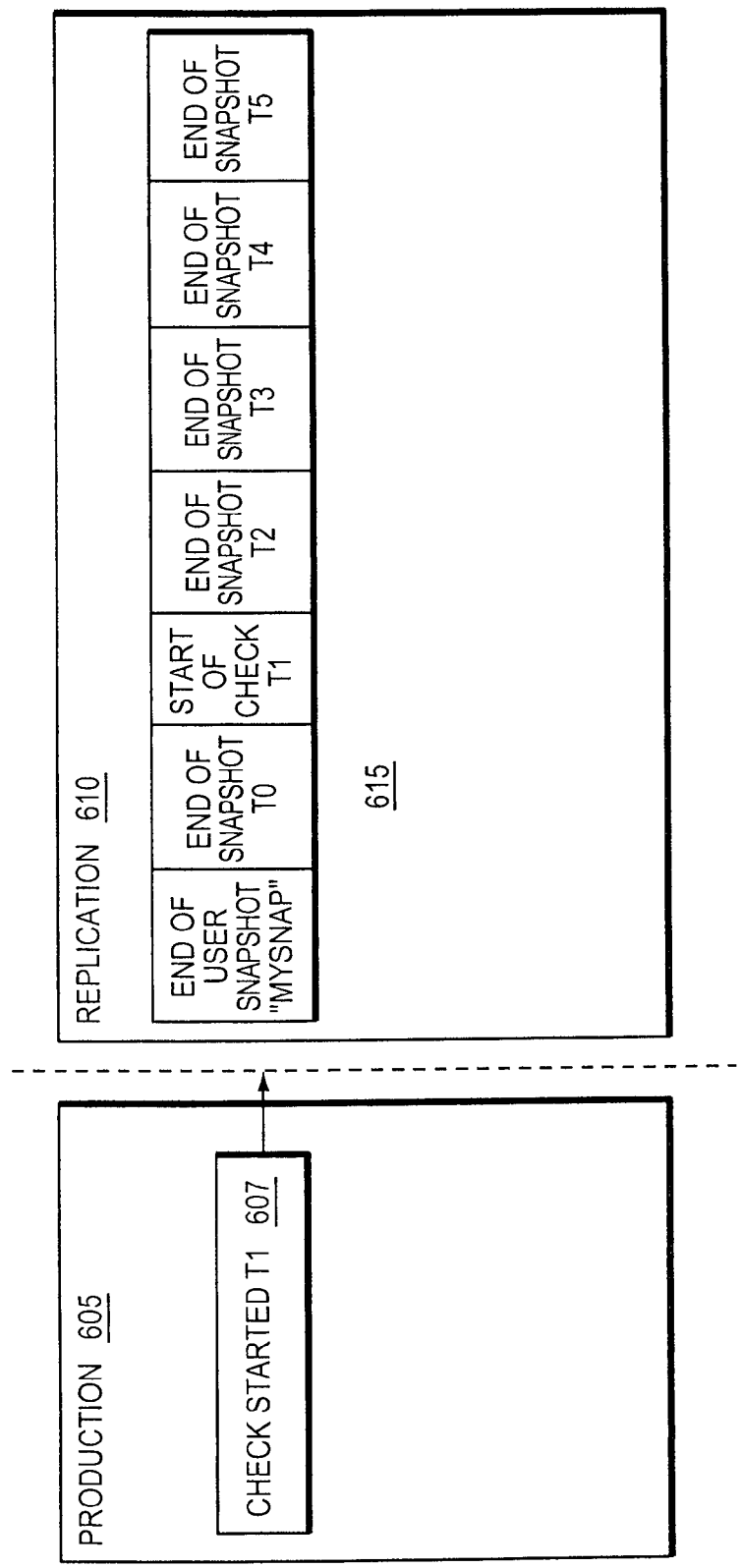
FIG. 6 is a simplified illustration of a notification of a start of a check in a replication environment, in accordance with an embodiment of the present disclosure.
Figure 7:
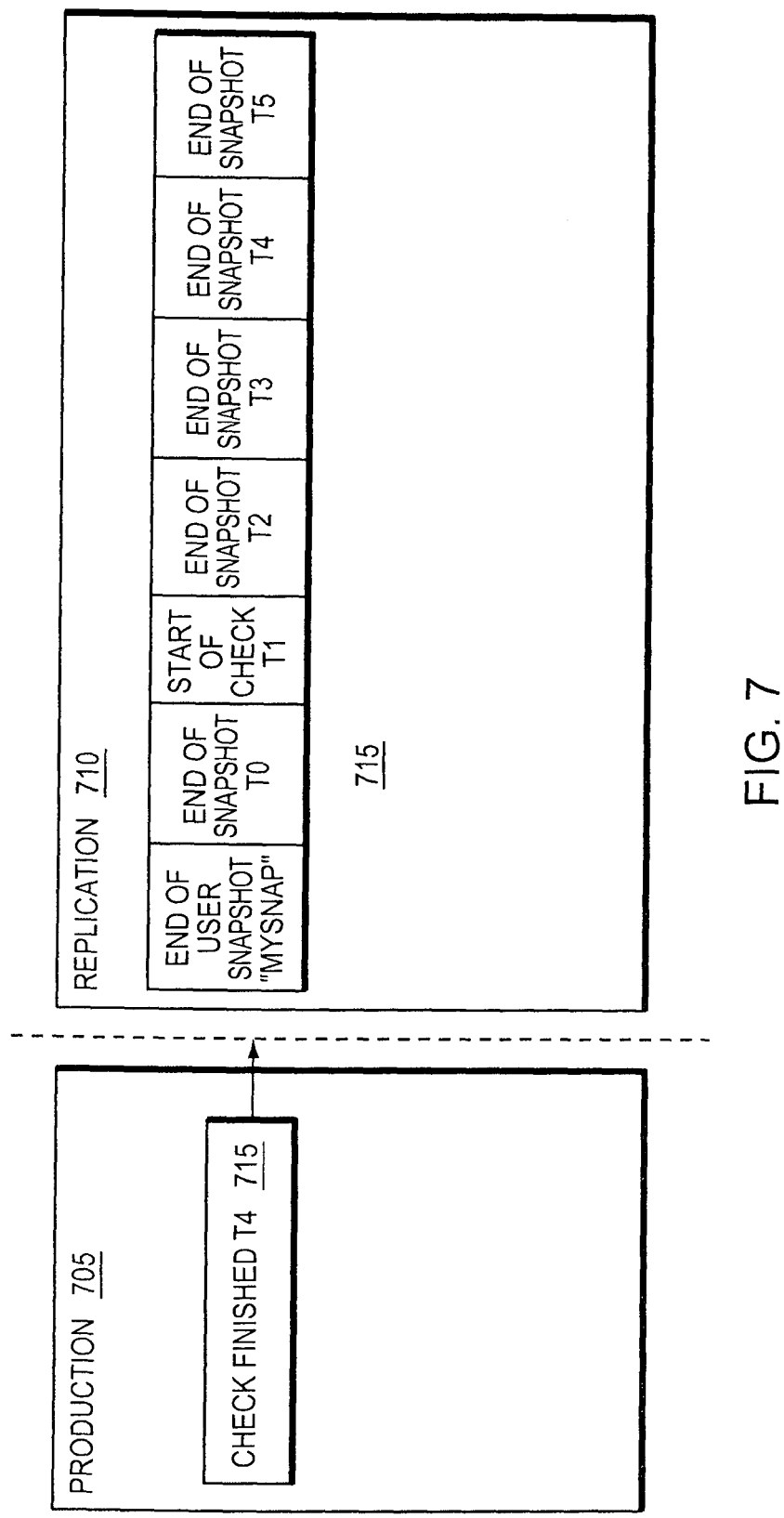
FIG. 7 is a simplified illustration of a notification of the end of a check in a replication environment, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered on the target side;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the beginning of the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Snapshots

The snapshots in a continuous replication may be messages in the DO and UNDO metadata streams, as the changes to the production site are tracked in the DO and UNDO streams. In certain embodiments, IO in the DO stream may be used to create snapshots. In at least one embodiment, the DO metadata stream may be a list of metadata indicating what points in time are consistent snapshots. In an embodiment, the metadata stream may be illustrated as follows:

| End of user snapshot "mysnap" | End of snapshot T0 | Start of check T1 | End of Snapshot T2 | End of snapshot T3 | End of check T4 | End of snapshot T5 |
|---|---|---|---|---|---|---|

In certain embodiments, when a user requests a snapshot, the system can read the DO metadata stream looking for the snapshot the user wants. In other embodiments, the user may create bookmark and the metadata in the metadata stream will include the name the user gave the snapshot. In some embodiments, the metadata may include the timestamp and some other information on where the snapshot is in the DO stream. In particular embodiments, as metadata stream maybe large and it may take time to find a snapshot in the metadata stream, the system may create a short list of important snapshots, which may include 1000 snapshots.

In some embodiments, the numbers of snapshots may number in the billions based on the transactions that have been stored in the DO and undo metadata streams. In these embodiments, the short list of snapshots may be persistently stored and include only 1000 of these billion snapshots. In certain embodiments, the short list may be created by the system. In at least some embodiments, the snapshots in the short list may be evenly separated by time, but may also keep user created snapshots with higher priority.

Snapshot Problems

Under certain conditions, a snapshot may not be suitable for use. For example, there may be an error in communicating the replication information to the recovery appliance, which may lead to an unstable snapshot. In certain embodiments, this may be because the splitter has failed. In other embodiments, this may be because the splitter is working incorrectly. In further embodiments, this may be because the splitter has begun marking the data (i.e. tracking the changes in the splitter memory) and not sending replication information to the recovery appliance, this may happen due to a temporary or permanent communication error between the splitter and the appliance.

In other embodiments, the replication may be performing properly, however there may be a problem with the information being transmitted. In some embodiments, there may be a virus on the production system. In certain embodiments, an application may not be functioning correctly. In alternative embodiments, an incorrect system configuration may have occurred. For example, an additional LUN may be added to the file system or the application on the production site; however the LUN may not have been added to the replication site. In further embodiments, an unreplicated LUN may now be accessible by a database on the production side but not replicated to the replication site. In these embodiments, the user may not know that a particular snapshot is not acceptable for use.

Snapshot Hardening

In certain embodiments, the current disclosure may enable information to be stored by the replication appliance to denote which snapshots are acceptable based on one or more checks. In some embodiments, a check may be performed on the production site. In some embodiments of the current disclosure, consistency of the snapshot on the replication site may be checked. In certain embodiments, this information about the check may be stored by the replication appliance. In at least one embodiment, information may be stored as metadata in the journal.

In some embodiments, the check may test in isolation or in combination the configuration and health of the replication. For example, the check may be in isolation or any combination of:
1. A virus check.
2. A check for application consistency (for instance running a database internal check)
3. A configuration check (i.e. all the LUNs used by an application are replicated. In case of failure the system may automatically add a LUN on the replica and replicate to it.)
4. A check that splitters are working correctly: a splitter may be suspected as not working and then the result may be that snapshots are suspected; a splitter also may be known to be in marking mode, in this case replication will stop and the snapshots from the last successful check will be marked as inconsistent. In some embodiments, replication will only start when problem is fixed.
5. A check that the replication is working correctly, i.e. running a replication integrity test. In some embodiments, the integrity test reads all the data on the production and compares it do data on the replica site. In certain embodiments, the test does not check area for which changes are tracked in the journal, if the test fails replication may stop, or system may automatically fix the areas which did not replicate correctly.

In some embodiments, a check start message is sent to the replication site, a check may be performed, and the result of the check may be sent to the replication site. The replication site may record the start and result of the check in the metadata of the DO metadata stream.

In at least some embodiments, the information may contain a time stamp indicating when the check was run. In certain embodiments, this information may be in the form of metadata. In further embodiments, the check information may be associated with a snapshot. In alternative embodiments, the replication site may receive information with a time stamp and associate the information with the appropriate snapshot or set of snapshots in the journal based on the time stamp. In some embodiments, when a check is performed and a problem is detected, the replication may be stopped. In other embodiments after a detection of a problem, the replication may continue but the system may note that the snapshot or set of snapshots are unstable.

In a particular embodiment, a check may have been started at Time 0 and finished at a Time 1. In this embodiment, the check completed successfully. Another check may be started at Time 2 and run to Time 3. If the second check fails, the snapshots between Times 0 and Times 3 may be marked as unstable. In certain embodiments, after two successful checks have been completed, the snapshots between the times the tests started may be marked as checked. In some embodiments, a check may start at T0 end at T1 and have an acceptable result. In these embodiments, a second check starting at T2 and ending at T3, may be performed. In these embodiments, if the second check is ok two we may assume that all snapshots between T0 and T2 are ok.

In certain embodiments, an integrity check may also perform additional communication between the production and replication site as outlined in the application "ENSURING CONSISTENCY OF REPLICATED VOLUMES," previously incorporated by reference. In this embodiment, the consistency may be checked and the result indicated it in the journal. In this embodiment, if the data between sites is identical snapshots may be marked as verified; otherwise data integrity is false. In this embodiment, if the integrity is false, the snapshots may be hidden from the user until they are fixed.

In further embodiments, if a problem is detected and fixed the system is notified of that a problem was fixed the system may invalidate all the snapshots between the last successful check and the current point in time. In some of these embodiments, if a LUN was added to the replication, the system knows that a LUN was added and will invalidate an unchecked snapshot. In other of these embodiments, if a virus enters the system and is cleaned, the antivirus may tell the system that virus was cleaned invalidating all snapshots from the last successful virus check until the current point in time.

Snapshot Presentation

In some embodiments, a user may have access to the snapshots of the replication. In these embodiments, the result of the checks or hardening information may be used to filter the snapshots that are presented to the user. In certain embodiments, if a snapshot or series of snapshots have negative results of a check, i.e. failed a virus check, inconsistent, LUN not replicated, these snapshots may be hidden from the user. In alternative embodiments, a snapshot may be classified as problematic, suspected as problematic, or verified as good. In some embodiments, user may have several configurations and based on the configuration, the user may be shown only good snapshots, all snapshots or a set of snapshots that satisfy a specific criterion. In further embodiments, a list of snapshots may be kept for each snapshot that has been determined to be virus free.

In some embodiments, if the user tries to search metadata streams, the snapshots presented to the user arte filtered by looking at the test start and test end results. In certain embodiments, when a user wants to access a snapshot the system can generate a snapshot list which apply to a set of criterion. For example, the criterion may be to present snapshots which have been virus checked, snapshots which are consistency proved, or all snapshots including those snapshots which may not work correctly.

Example Embodiment of Communication of a Check

Refer now to the example embodiments of FIGS. 4, 5, 6, and 7. Production site 605 may send notification of a start of a check with a time stamp T1 607 to replication site 610 (step 405). Replication site 610 may receive the start notification 607 (step 502).

Replication site 610 may store the start of the test in journal (step 505). Production site 605 may perform a check, which may result in a determination that the production site has successfully finished a check (step 410). When the check is complete production site 705 may send a notification that check was complete with a timestamp T2 707 and the result of the check (415). Replication site 710 may receive the result of the check (step 510). Replication site 710 may store the information 707 associated with the check (step 515).

In some embodiments, the information about a particular snapshot may be stored as metadata. In certain embodiments, the metadata about a snapshot may be stored with the snapshot itself. In certain embodiments, there may be other information transmitted with the information about the check. In some embodiments, as the check may be performed on a changing production site, and it may not be possible to denote which particular snapshots have been checked, rather a range of snapshots may need to be marked. As noted above, the check can be a single check, i.e. a virus check, or a combination of checks such as a consistency and splitter check.

Example Embodiments of a Journal with Hardening Information

Figure 8:
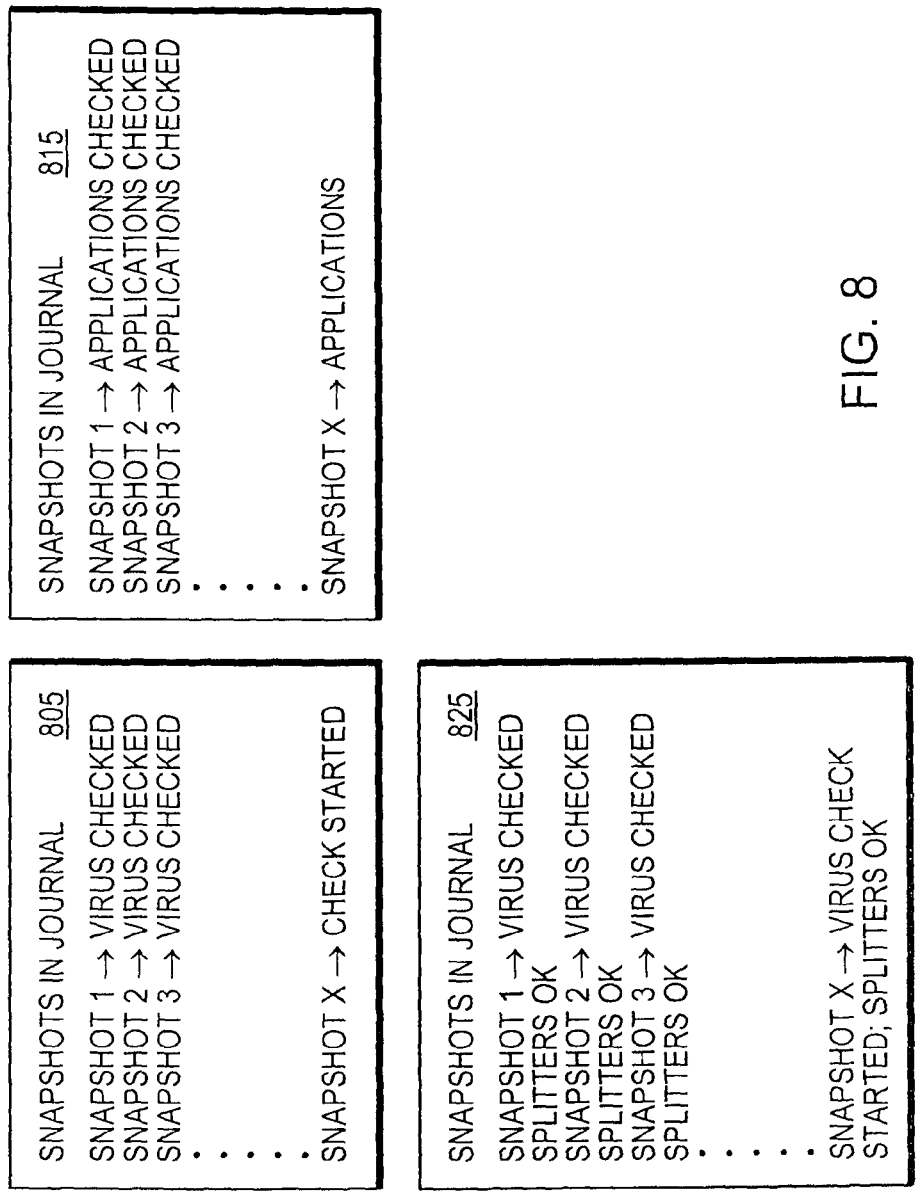
FIG. 8 is a simplified illustration of check information in a journal, in accordance with an embodiment of the present disclosure.

Refer now to the example embodiment of FIG. 8. FIG. 8 illustrates some information that may be stored for the snapshots in a journal, such as journals 805, 815, and 825 (note that the Journals of FIG. 8 are alternative embodiments of Journals 615 and 715 of FIGS. 6 and 7). For example in Journal 805, it is indicated for different Snapshots whether a virus check has been completed or has been started. In Journal 815, it is indicated that the applications have been checked in different snapshots to determine the applications are functioning correctly. In Journal 825, it has been determined for different snapshots that the snapshot has been virus checked and the splitters are ok, or the splitters are ok and the virus check has been started.

In an alternative embodiment, in continuous replication there may be a journal with a list of metadata. In this embodiment, there is a test start and test end as well as snapshots listed in the metadata. In this embodiment, as in continuous replication, a snapshot is a point in the stream. In this embodiment, there may be a list of snapshots kept which are updated as stated as verification continues.

In certain embodiments, it may be enabled that a journal will have metadata associated with each snapshot. In these embodiments, as checks are performed on the production site, the results of the tests may be sent to the replication site. The replication site may incorporate the results of the tests into the metadata about the snapshots. The replication site may then know, for each snapshot, whether certain tests have been performed or are currently being performed.

In at least some embodiments, the journal has a list of metadata which includes points in times which are snapshots and messages with information denoting that test X started at time T1, and test X completed at time T2 with status X. In these embodiments, when a search for a snapshot is performed on the journal metadata and a test complete message is detected, and the matching start test message may also be searched. Based on the search and the messages and the snapshots between the start message and the test completed message can be marked as successfully validated for test x. In at least one embodiment, Test X may be a virus test and the snapshots may be marked as virus checked.

Example Embodiments of Filtering Snapshots Based on Hardening Information

Figure 9:
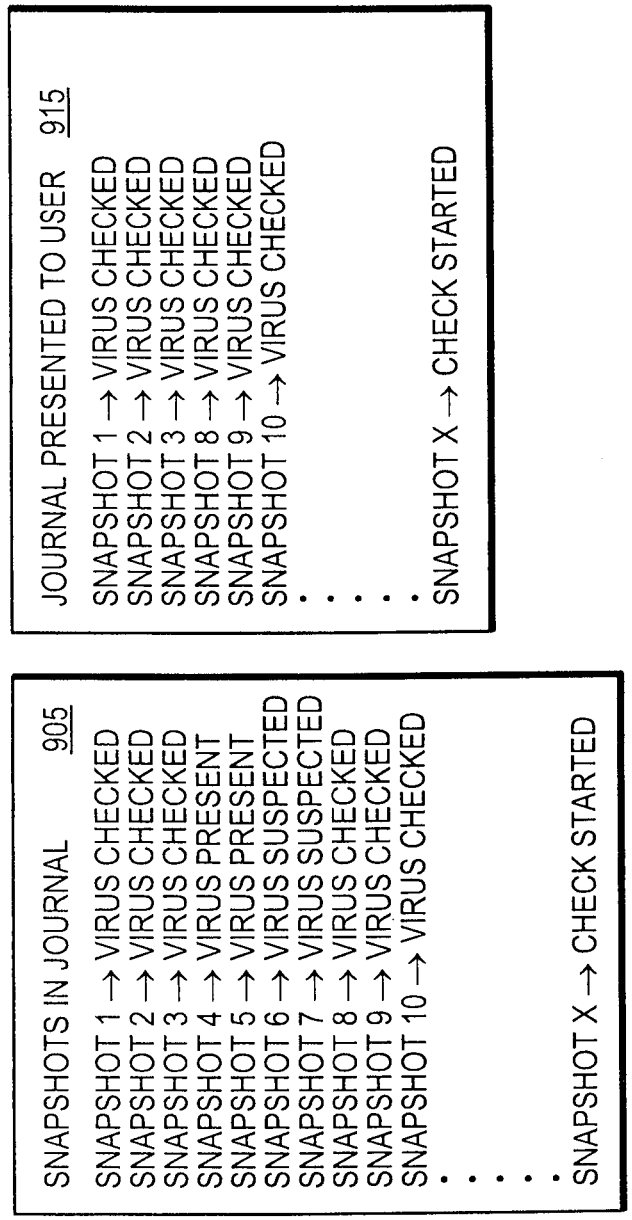
FIG. 9 is a simplified illustration of check information in a journal and a sample snapshot list to be presented to a user, in accordance with an embodiment of the present disclosure.

Refer now to the embodiment of FIG. 9. FIG. 9 illustrates a journal 905 with virus check information. In this embodiment, there may be a setting that a user should only be presented with snapshots that have been successfully virus checked. The information of Journal 915 represents a sample snapshot list 915 based on journal 905 for presentation to the user. This journal has been filtered to only display snapshots that have been successfully virus checked.

Figure 10:
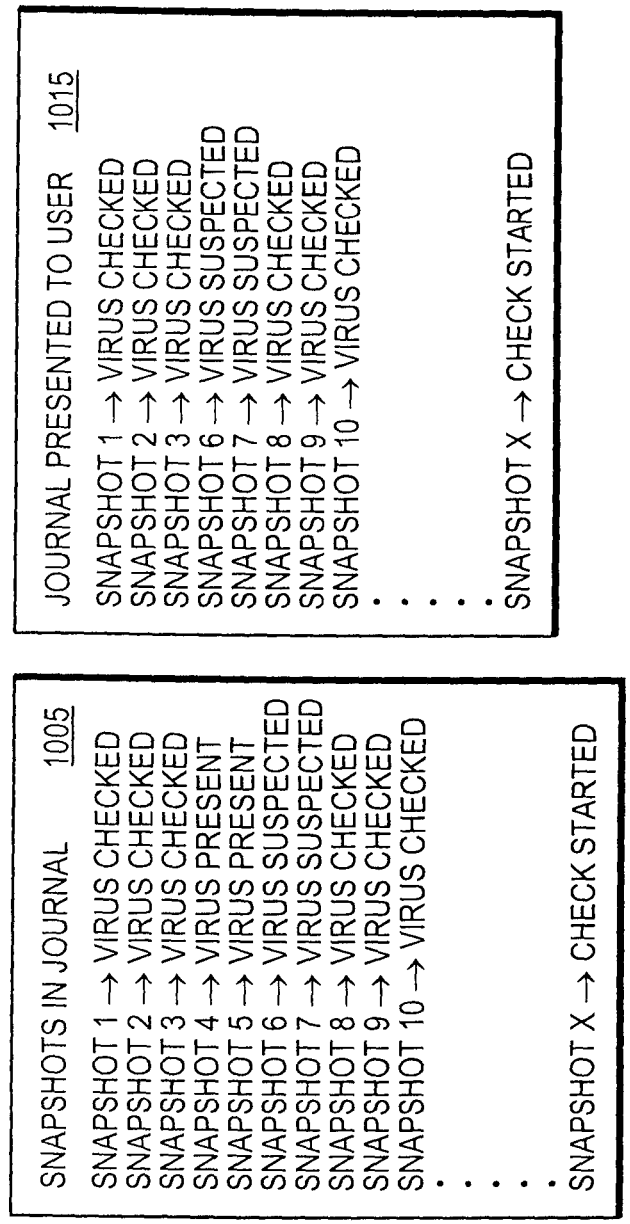
FIG. 10 is a simplified illustration of check information in a journal and a sample snapshot list to be presented to a user, in accordance with an embodiment of the present disclosure.

Refer now to the embodiment of FIG. 10. FIG. 10 illustrates a journal 1005 with virus check information. In this embodiment, there may be a setting that a user should only be presented with snapshots that have been successfully virus checked or that are suspected to have a journal, but not snapshots that are known to have a virus. The information of snapshots list 1015 represents a sample snapshot list 1015 based on journal 1005 for presentation to the user. This journal has been filtered to only display snapshots that have been successfully virus checked or are suspected to have a virus.

Figure 11:
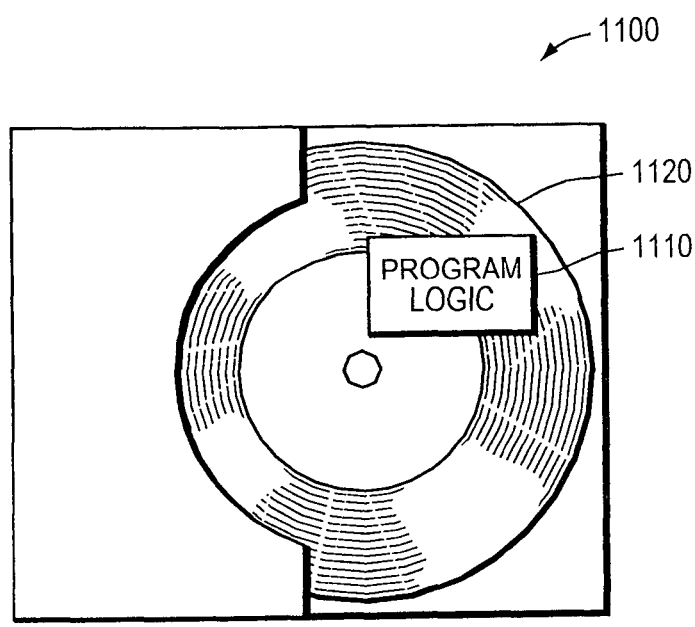
FIG. 11 is an embodiment of the present invention in program code, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 11 shows Program Logic 1110 embodied on a computer-readable medium 1130 as shown, and wherein the Logic is encoded in computer-executable code configured for carrying out the reservation service process of this invention and thereby forming a Computer Program Product 1100.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer executed method, the method comprising:
    sending notification of a start of a check on a production site from the production site to a replication site, wherein the notification comprises a start time of the check;
    receiving the notification at the replication site;
    recording the time of the start of the check on the production site by the replication site based on the notification;
    running the check on the production site;
    sending the result of the check on the production site to the replication site;
    receiving the result of the check on the production site at the replication site including the time the check completed, wherein one or more snapshots occur at the replication site of data on the replication site between the start of the check and the end of the check;
    upon completion of the check, associating snapshots of the one or more snapshots created at the replication site during a time period between the start of the check on the production site and the completion of the check on the production site with the check to indicate which of the one or more snapshots occurred on the replication site during the check on the production site, wherein the snapshots associated with the check are marked with a status of the check.

2. The method of claim 1 wherein the check comprises a virus check, the status indicates whether a virus was found during the check; and wherein the snapshots associated with the check have a status indicating whether or not the snapshots contain a virus.

3. The method of claim 1 wherein the check comprises a check of whether splitters on the production site are functioning normally; wherein the splitters are enabled to intercept IO on a data path between a host and a storage array at the production site and split a copy of the IO to a replication site.

4. The method of claim 1 wherein the check comprises a check of the replication configuration on the production site.

5. The method of claim 1 wherein the check comprises of verifying the applications running on the production site work properly, the status of the check indicates whether the applications work correctly, and wherein the snapshots associated with the check are marked as to whether or not the applications in the snapshots are functioning correctly.

6. The method of claim 1 wherein the check is run on the production site and the results of the check are transmitted to the replication site.

7. The method of claim 6 wherein the check is stored as metadata associated with a snapshot in a journal on the replication site.

8. The method of claim 1 wherein the check is a check of the integrity of the replication.

9. The method of claim 1 wherein the check denotes a status of the snapshot; and wherein the snapshots presented to a user may be filtered by the status of the snapshot.

10. The method of claim 1 wherein based on the result of the check, the system configuration is changed.

11. The method of claim 1 wherein the start of the check is recorded in a journal on the replication site and wherein the completion of the check is recorded in a journal on the replication site.

12. The method of claim 1 further comprising:
    in response to a user requesting access to snapshots, filtering the snapshots by the result of the check associated with the one or more snapshots; and
    returning to the user a set of the one or more snapshots filtered by the result of the check.

13. The method of claim 12 further wherein the filtering is performed by examining the start and end time of a check and returning to the user snapshots occurring during the period denoted by the start time and end time and with a positive check result.

14. A system for hardening a snapshot in a journal based replication environment, the system comprising:
    a production site;
    a replication site,
    computer-executable program code operating in one or more processors, wherein the computer-executable program code is configured for execution of the following steps:
        sending notification of a start of a check on the production site from the production site to the replication site, wherein the notification comprises a start time of the check;
        receiving the notification at the replication site;
        recording the time of the start of the check on the production site on the replication site based on the notification;
        running the check on the production site;
        sending the result of the check on the production site to the replication site;
        receiving the result of the check on the production site at the replication site including the time the check completed, wherein one or more snapshots occur at the replication site of data on the replication site between the start of the check and the end of the check;
        upon completion of the check, associating snapshots of the one or more snapshots created at the replication site during a time period between the start of the check on the production site and the completion of the check on the production site with the check to indicate which of the one or more snapshots occurred on the replication site during the check on the production site wherein the snapshots associated with the check are marked with a status of the check.

15. The system of claim 14 wherein the check comprises a virus check, the status indicates whether a virus was found during the check; and wherein the snapshots associated with the check have a status indicating whether or not the snapshots contain a virus.

16. The system of claim 14 wherein the check comprises a check of whether splitters on the production site are functioning normally; wherein the splitters are enabled to intercept IO on a data path between a host and a storage array at the production site and split a copy of the IO to a replication site.

17. The system of claim 14 wherein the check comprises a check of the replication configuration on the production site.

18. The system of claim 14 wherein the check comprises of verifying the applications running on the production site work properly the status of the check indicates whether the applications work correctly, and wherein the snapshots associated with the check are marked as to whether or not the applications in the snapshots are functioning correctly.

19. A program product comprising:
 a non-transitory computer-readable storage medium encoded with computer-executable program code enabling:
  sending notification of a start of a check on the production site from the production site to the replication site, wherein the notification comprises a start time of the check;
  receiving the notification at the replication site;
  recording the time of the start of the check on the production site on the replication site based on the notification;
  running the check on the production site;
  sending the result of the check on the production site to the replication site;
  receiving the result of the check on the production site at the replication site including the time the check completed, wherein one or more snapshots occur at the replication site of data on the replication site between the start of the check and the end of the check;
  upon completion of the check, associating snapshots of the one or more snapshots created at the replication site during a time period between the start of the check on the production site and the completion of the check on the production site with the check to indicate which of the one or more snapshots occurred on the replication site during the check on the production site wherein the snapshots associated with the check are marked with a status of the check.

20. The program product of claim 19 wherein the check comprises a virus check, the status indicates whether a virus was found during the check; and wherein the snapshots associated with the check have a status indicating whether or not the snapshots contain a virus.

21. The program product of claim 19 wherein the check comprises a check of whether splitters on the production site are functioning normally; wherein the splitters are enabled to intercept IO on a data path between a host and a storage array at the production site and split a copy of the IO to a replication site.

22. The program product of claim 19 wherein the check comprises a check of the replication configuration on the production site.

23. The program product of claim 19 wherein the check comprises of verifying the applications running on the production site work properly, the status of the check indicates whether the applications work correctly, and wherein the snapshots associated with the check are marked as to whether or not the applications in the snapshots are functioning correctly.

* * * * *